(12) United States Patent
Yoon et al.

(10) Patent No.: US 11,327,555 B2
(45) Date of Patent: May 10, 2022

(54) APPLICATION PROCESSOR PERFORMING A DYNAMIC VOLTAGE AND FREQUENCY SCALING OPERATION, COMPUTING SYSTEM INCLUDING THE SAME, AND OPERATION METHOD THEREOF

(71) Applicant: SAMSUNG ELECTRONICS CO., LTD., Suwon-si (KR)

(72) Inventors: Seok-Ju Yoon, Yongin-si (KR); Nak-Woo Sung, Yongin-si (KR); Seung-Chull Suh, Seongnam-si (KR); Taek-Ki Kim, Seongnam-si (KR); Jae-Joon Yoo, Incheon (KR); Eun-Ok Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/994,894

(22) Filed: Aug. 17, 2020

(65) Prior Publication Data

US 2020/0379541 A1     Dec. 3, 2020

Related U.S. Application Data

(63) Continuation of application No. 15/797,383, filed on Oct. 30, 2017, now Pat. No. 10,747,297.

(30) Foreign Application Priority Data

Dec. 28, 2016 (KR) .................. 10-2016-0181444

(51) Int. Cl.
*G06F 1/329*     (2019.01)
*G06F 1/3228*    (2019.01)
(Continued)

(52) U.S. Cl.
CPC .............. *G06F 1/329* (2013.01); *G06F 1/324* (2013.01); *G06F 1/3228* (2013.01); *G06F 1/3296* (2013.01)

(58) Field of Classification Search
CPC ........ G06F 1/329; G06F 1/3228; G06F 1/324; G06F 1/3296
See application file for complete search history.

(56) References Cited

U.S. PATENT DOCUMENTS 7,711,966 B2    5/2010   Prabhakaran et al.
8,327,172 B2    12/2012  David et al.
(Continued)

FOREIGN PATENT DOCUMENTS

KR     1020160063974     6/2016

OTHER PUBLICATIONS

Choi, Kihwan et al., "Dynamic Voltage and Frequency Scaling based on Workload Decomposition", ISLPED '04, Aug. 9-11, 2004, Newport Beach, California, USA.
(Continued)

*Primary Examiner* — Phil K Nguyen
*Assistant Examiner* — Gayathri Sampath
(74) *Attorney, Agent, or Firm* — F. Chau & Associates, LLC

(57) ABSTRACT

A method of operating an application processor including a central processing unit (CPU) with at least one core and a memory interface includes measuring, during a first period, a core active cycle of a period in which the at least one core performs an operation to execute instructions and a core idle cycle of a period in which the at least one core is in an idle state, generating information about a memory access stall cycle of a period in which the at least one core accesses the memory interface in the core active cycle, correcting the core active cycle using the information about the memory
(Continued)

access stall cycle to calculate a load on the at least one core using the corrected core active cycle, and performing a DVFS operation on the at least one core using the calculated load on the at least one core.

23 Claims, 22 Drawing Sheets

(51) Int. Cl.
    *G06F 1/324*    (2019.01)
    *G06F 1/3296*    (2019.01)
    *G06F 15/167*    (2006.01)
    *G06F 9/50*    (2006.01)

(56) References Cited

U.S. PATENT DOCUMENTS

| | | | |
|---|---|---|---|
| 8,438,410 B2 | 5/2013 | David et al. | |
| 8,996,595 B2 | 3/2015 | Gargash et al. | |
| 9,086,883 B2 | 7/2015 | Thomson et al. | |
| 9,684,461 B1* | 6/2017 | Dodson | G06F 3/0658 |
| 2009/0089598 A1 | 4/2009 | Fenger et al. | |
| 2010/0103758 A1 | 4/2010 | Riho et al. | |
| 2013/0013832 A1* | 1/2013 | Tanaka | G06F 12/0835 |
| | | | 710/119 |
| 2013/0346774 A1 | 12/2013 | Bhandaru et al. | |
| 2014/0075224 A1 | 3/2014 | Lee et al. | |
| 2014/0089699 A1 | 3/2014 | O'Connor et al. | |
| 2014/0215243 A1 | 7/2014 | Sado et al. | |
| 2014/0281594 A1 | 9/2014 | Yang et al. | |
| 2015/0106649 A1* | 4/2015 | Kannan | G06F 21/85 |
| | | | 713/501 |
| 2015/0185797 A1* | 7/2015 | Cooper | G06F 1/3296 |
| | | | 713/340 |
| 2016/0154449 A1* | 6/2016 | Lim | G06F 1/3296 |
| | | | 713/322 |
| 2017/0192484 A1 | 7/2017 | Priyadarshi et al. | |
| 2018/0181183 A1 | 6/2018 | Yoon et al. | |

OTHER PUBLICATIONS

David, Howard, et al., "Memory Power Management via Dynamic Voltage/Frequency Scaling", ICAC'11, Jun. 14-18, 2011, Karlsruhe, Germany.

Miftakhutdinov, Rustam, et al., "Predicting Performance Impact of DVFS for Realistic Memory Systems", Proceeding MICRO-45 Proceedings of the 2012 45th Annual IEEE/ACM International Symposium on Microarchitecture, Dec. 1-5, 2012, Vancouver, B.C., Canada, pp. 155-165.

Poellabauer, Christian, et al., "Feedback-Based Dynamic Voltage and Frequency Scaling for Memory-Bound Real-Time Applications", Real Time and Embedded Technology and Applications Symposium, 2005. RTAS 2005. 11th IEEE, Mar. 7-10, 2005.

Rajan, Dinesh, et al., "Workload-Aware Dual-Speed Dynamic Voltage Scaling", Proceedings of the 12th IEEE International Conference on Embedded and Real-Time Computing Systems and Applications (RTCSA'06).

U.S. Office Action dated Nov. 25, 2019 In Corresponding U.S. Appl. No. 15/797,383.

* cited by examiner

FIG. 4A $$CL_{core} = \left( \frac{T_{act} * \frac{CPI}{CPI+SPI}}{T_{act} * \frac{CPI}{CPI+SPI} + T_{idle}} \right) = \frac{T_{act}'}{T_{act}' + T_{idle}}$$

CPI > TH_CPI(case_1)
SPI=CPI−TH_CPI

FIG. 4B $$CL_{core} = \left( \frac{T_{act} * \frac{CPI}{CPI}}{T_{act} * \frac{CPI}{CPI} + T_{idle}} \right) = \frac{T_{act}}{T_{act} + T_{idle}}$$

CPI ≤ TH_CPI(case_2)
SPI(=None)

FIG. 13

$$CL_M = \frac{M\_T_{data} + M\_T_{R0}}{M\_T_{act} + M\_T_{idle}} = \frac{M\_T_{act}}{M\_T_{total}}$$

APPLICATION PROCESSOR PERFORMING A DYNAMIC VOLTAGE AND FREQUENCY SCALING OPERATION, COMPUTING SYSTEM INCLUDING THE SAME, AND OPERATION METHOD THEREOF

CROSS-REFERENCE TO RELATED APPLICATION

This application is a continuation application of U.S. patent application Ser. No. 15/797,383 filed Oct. 30, 2017, which claims priority under 35 U.S.C. § 119 to Korean Patent Application No. 10-2016-0181444, filed on Dec. 28, 2016 in the Korean Intellectual Property Office, the disclosures of which are incorporated by reference herein in their entirety.

TECHNICAL FIELD

Exemplary embodiments of the inventive concept relate to an application processor, and more particularly, to an application processor capable of efficiently performing a dynamic voltage and frequency scaling (DVFS) operation, a computing system including the same, and an operation method thereof.

DISCUSSION OF RELATED ART

As the number of cores increases in computing systems such as mobile devices to increase multi-thread performance in a mobile environment and patented master intellectual properties (IPs) are continuously added for various multimedia scenarios in an application processor therein, power management may be used to optimize resource allocation among different components. For example, the application processor may perform a dynamic voltage and frequency scaling (DVFS) operation to adjust a frequency and a voltage therein to control performance and power consumption.

SUMMARY

According to an exemplary embodiment of the inventive concept, a method of operating an application processor, which includes a central processing unit (CPU) with at least one core and a memory interface, including measuring, during a first period, a core active cycle of a period in which the at least one core performs an operation to execute instructions and a core idle cycle of a period in which the at least one core is in an idle state, generating information about a memory access stall cycle of a period in which the at least one core accesses the memory interface in the core active cycle, correcting the core active cycle using the information about the memory access stall cycle to calculate a load on the at least one core using the corrected core active cycle, and performing a dynamic voltage and frequency scaling (DVFS) operation on the at least one core using the calculated load on the at least one core.

According to an exemplary embodiment of the inventive concept, a method of operating a computing system, which includes a plurality of master intellectual properties (IPs), a memory device, and a memory interface, including measuring, during a predetermined period, a memory active cycle including a data transaction cycle of a period in which the memory interface performs a data input/output operation using the memory device in response to a request from at least one of the master IPs and a ready operation cycle of a period in which an operation required to perform the data input/output operation is performed, calculating a load on a memory clock domain including the memory device and the memory interface using the memory active cycle, and performing a DVFS operation on the memory interface and the memory device using the load on the memory clock domain.

According to an exemplary embodiment of the inventive concept, an application processor includes a memory interface connected to at least one external memory device, an input/output interface connected to at least one external master IP, a multi-core CPU including a plurality of cores, and a memory configured to store a DVFS program. Each of the plurality of cores is configured to correct a core active cycle of a period in which an operation is performed to execute instructions during a first period by using information about a memory access stall cycle of a period in which each core accesses the memory interface within the core active cycle and to execute a program stored in the memory to perform a DVFS operation using the corrected core active cycle.

BRIEF DESCRIPTION OF THE DRAWINGS

The above and other features of the inventive concept will be more clearly understood by describing in detail exemplary embodiments thereof with reference to the accompanying drawings.

FIGS. 4A and 4B are views showing mathematical expressions to obtain a load on core in a DVFS operation, according to an exemplary embodiment of the inventive concept.

FIG. 13 is a view showing a mathematical expression to obtain a load on a memory interface in a DVFS operation with respect to the memory interface, according to an exemplary embodiment of the inventive concept.

DETAILED DESCRIPTION OF THE EMBODIMENTS

Figure 1:
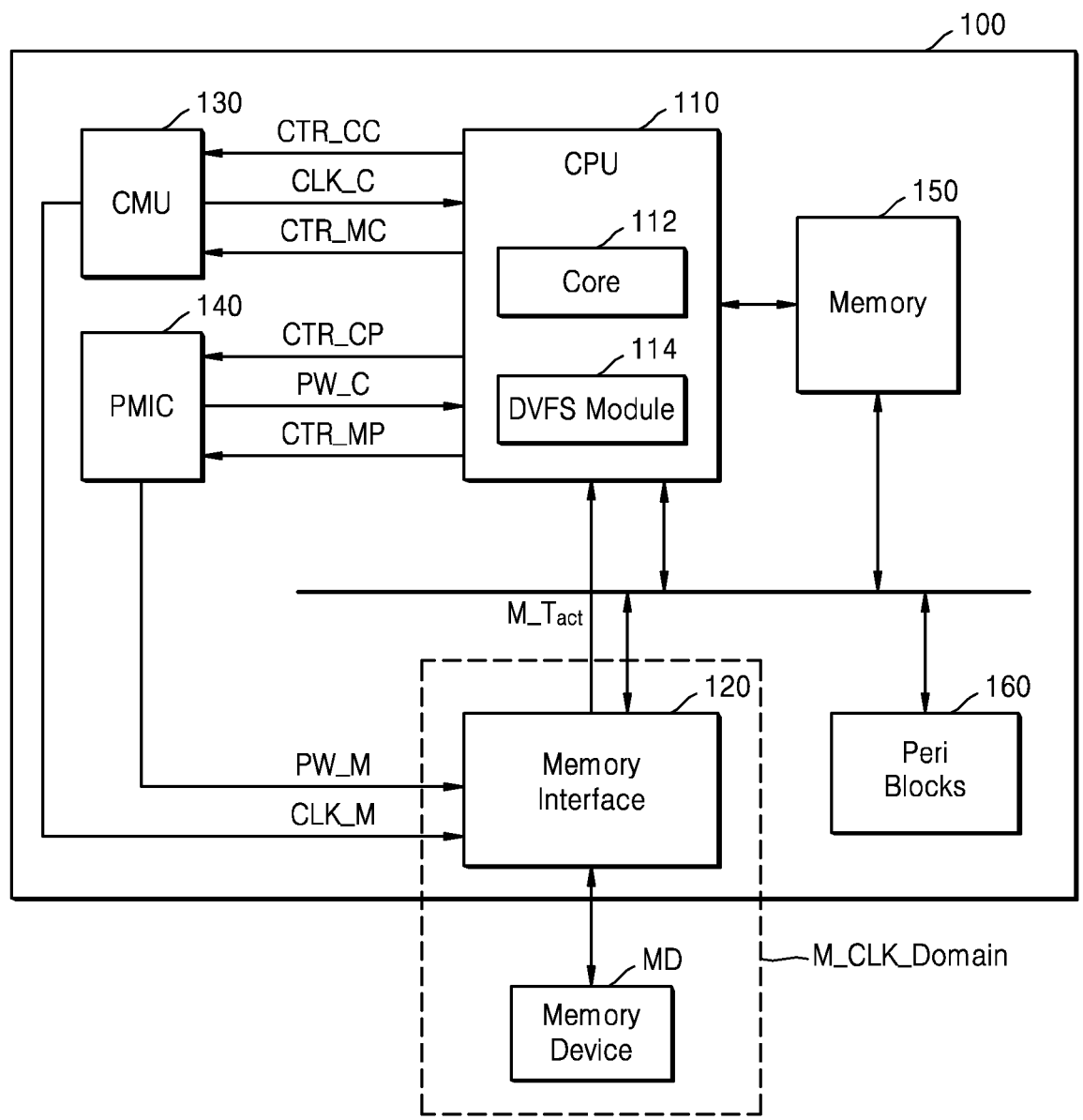
FIG. 1 is a block diagram showing a computing system according to an exemplary embodiment of the inventive concept.

Hereinafter, exemplary embodiments of the inventive concept will be explained in detail with reference to the accompanying drawings. Like reference numerals may refer to like elements throughout this application.

Exemplary embodiments of the inventive concept provide an application processor capable of enhancing user experience and optimizing power consumption, a computing system including the same, and an operation method thereof.

FIG. 1 is a block diagram showing a computing system according to an exemplary embodiment of the inventive concept.

Referring to FIG. 1, a computing system 10 may include an application processor 100 and a memory device MD. The computing system 10 shown in FIG. 1 may correspond to various types of data processing devices, and as an example, the computing system 10 may be a mobile device employing the application processor 100. In addition, the computing system 10 may be a laptop computer, a mobile phone, a smart phone, a tablet personal computer (PC), a Personal Digital Assistant (PDA), an Enterprise Digital Assistant (EDA), a digital still camera, a digital video camera, a Portable Multimedia Player (PMP), a Personal Navigation Device or a Portable Navigation Device (PND), a handheld game console, a Mobile Internet Device (MID), a wearable computer, an Internet of Things (IoT) device, an Internet of Everything (IoE) device, an e-book, etc.

The computing system 10 may include various kinds of memory devices MD. For instance, the memory device MD may correspond to various kinds of semiconductor memory devices. According to an exemplary embodiment of the inventive concept, the memory device MD may be a Dynamic Random Access Memory (DRAM), such as a Double Data Rate Synchronous Dynamic Random Access Memory (DDR SDRAM), a Low Power Double Data Rate (LPDDR) SDRAM, a Graphics Double Data Rate (GDDR) SDRAM, a Rambus Dynamic Random Access Memory (RDRAM), etc. In addition, the memory device MD may be one of a flash memory, a Phase-change RAM (PRAM), a Magnetoresistive RAM (MRAM), a Resistive RAM (Re-RAM), or a Ferroelectric RAM (FeRAM).

The application processor 100 may be implemented by a System-on-Chip (SoC). The SoC may include a system bus to which a protocol having a predetermined standard bus specification is applied and various Intellectual Properties (IPs) connected to the system bus. As a standard specification of the system bus, an Advanced Microcontroller Bus Architecture (AMBA) protocol of Advanced RISC Machine (ARM) may be applied. A bus type of the AMBA protocol may include Advanced High-performance Bus (AHB), Advanced Peripheral Bus (APB), Advanced eXtensible Interface (AXI), AXI4, AXI Coherency Extensions (ACE), or the like. In addition, other types of protocols, such as uNetwork of SONICs Inc., CoreConnect of IBM, Open Core Protocol of OCP-IP, etc., may be used.

The application processor 100 may include a central processing unit (CPU) 110, a memory interface 120, a clock management unit (CMU) 130, a power management integrated circuit (PMIC) 140, an internal memory 150, and peri blocks 160. In the present exemplary embodiment shown in FIG. 1, the PMIC 140 is implemented in the application processor 100, but may instead be implemented outside the application processor 100. In addition, the application processor 100 may include a power management unit instead of the PMIC 140 to control a power supplied to functional blocks in the application processor 100.

The CPU 110 may include at least one core 112 and may be implemented by a multi-core processor. The core 112 may be an independent processor, and the core 112 may read and execute instructions. The core 112 may load a dynamic voltage and frequency scaling (hereinafter, referred to as "DVFS") module 114 from the internal memory 150 and execute the DVFS module 114 to perform a DVFS operation. The term "module" used hereinafter may mean hardware or computer program code capable of performing a function or an operation. However, the term "module" used hereinafter should not be limited thereto, and may mean an electronic recording medium, e.g., a processor, with computer program code therein that performs a specific function and operation. In other words, the term "module" may mean a functional and/or structural combination of hardware configured to achieve a technical idea of the inventive concept and/or software configured to instruct the hardware to operate.

The peri blocks 160 may correspond to a peripheral block other than the CPU 110, and as an example, the peri blocks 160 may include various functional blocks, such as an input/output (IO) interface block, a universal serial bus (USB) host block, a universal serial bus (USB) slave block, etc., which communicate with at least one master intellectual property (IP).

The DVFS module 114 may determine an operation state of various functional blocks in the application processor 100 and provide control signals to the CMU 130 and the PMIC 140 to control a frequency and/or a power of the various functional blocks based on a determined result. As an example, the DVFS module 114 may control a frequency and a power of a clock signal applied to the CPU 110 and may separately control a frequency and a power of a clock signal applied to the memory interface 120.

The memory interface 120 may access the memory device MD to write data in the memory device MD or to read out data from the memory device MD. The memory interface 120 may interface with the memory device MD and provide various commands, e.g., a write command, a read command, etc., to the memory device MD to perform a memory operation. Accordingly, the memory interface 120 and the memory device MD may be included in a same memory clock domain M_CLK_Domain, and the memory interface 120 and the memory device MD, which are included in the memory clock domain M_CLK_Domain, may perform the memory operation based on clock signals having substantially the same frequency.

When an L2 cache miss occurs when the core 112 processes instructions, the core 112 temporarily stops a calculation operation and accesses the memory interface 120 to write data, which is required to process the instructions, in the memory device MD or to read the data from the memory device MD. Hereinafter, the operation in which the core 112 accesses the memory interface 120 may comprehensively refer to an operation in which the core 112 accesses the memory device MD. The operation in which the core 112 stops the calculation operation with respect to the instructions and accesses the memory interface 120 may be referred to as a "memory access stall".

The DVFS module 114 according to the present exemplary embodiment may perform the DVFS operation by taking into account a cycle of a memory access stall period in which the core 112 substantially does not perform the calculation operation. The term "cycle" used hereinafter may indicate a time of a predetermined period and may be changed depending on the frequency of the clock signals that are the basis for the operation of the core 112 or the memory interface 120. For instance, when a cycle value is "n", the cycle may correspond to a time corresponding to n periods of the clock signals that are the basis for the operation of the core 112 or the memory interface 120. As an example, the DVFS module 114 may correct a core active cycle of the period in which the core 112 processes the instructions within a first period based on information on the memory access stall cycle, such that the core active cycle includes only the cycle in which the core 112 substantially performs the calculation operation. The DVFS module 114 may correct the core active cycle by subtracting the memory access stall cycle from the core active cycle.

The DVFS module 114 may calculate a load on the core 112 using the corrected core active cycle and a core idle cycle of a period in which the core 112 is in an idle state within the first period. The DVFS module 114 may provide a clock control signal CTR_CC to the CMU 130 or provide a power control signal CTR_CP to the PMIC 140 based on the load on the core 112.

The CMU 130 may provide a clock signal CLK_C having a scaled frequency to the CPU 110 in response to the clock control signal CTR_CC. In addition, the PMIC 140 may provide a power PW_C having a scaled level to the CPU 110 in response to the power control signal CTR_CP.

The DVFS module 114 according to the present exemplary embodiment may perform the DVFS operation on the memory interface 120 separately from the CPU 110. The DVFS module 114 may collect a memory active cycle M_T$_{act}$ from the memory interface 120. The memory active cycle M_T$_{act}$ indicates a cycle in which the memory interface 120 and the memory device MD, which are included in the memory clock domain M_CLK_Domain, perform memory operation in response to a predetermined request from the CPU 110 or another master IP.

As an example, in a second period, the memory active cycle M_T$_{act}$ may include a data transaction cycle of a period in which the memory interface 120 performs a data input/output operation using the memory device MD and a ready operation cycle of a period in which the memory interface 120 performs an operation required for the data input/output operation in response to the request from the CPU 110 or another master IP.

The DVFS module 114 may calculate the load with respect to the memory interface 120 by taking into account the period required to perform the data input/output operation using the memory device MD in addition to the data transaction cycle corresponding to a bandwidth of data input and output through the memory interface 120 and the memory device MD.

The DVFS module 114 may calculate a load on the memory clock domain M_CLK_Domain including the memory interface 120 and the memory device MD, based on the collected memory active cycle M_T$_{act}$ and perform the DVFS operation on the memory interface 120 based on the calculated load. As described above, since the memory interface 120 and the memory device MD are included in the same memory clock domain M_CLK_Domain, the memory device MD may receive the same clock signal CLK_M as the memory interface 120 according to the result of the DVFS operation and may also receive the same power PW_M as the memory interface 120.

The application processor 100 according to the present exemplary embodiment individually performs the DVFS operation by taking into account the load on each of the CPU 110 and the memory interface 120, and thus, performance of the application processor 100 may be increased.

Figure 2:
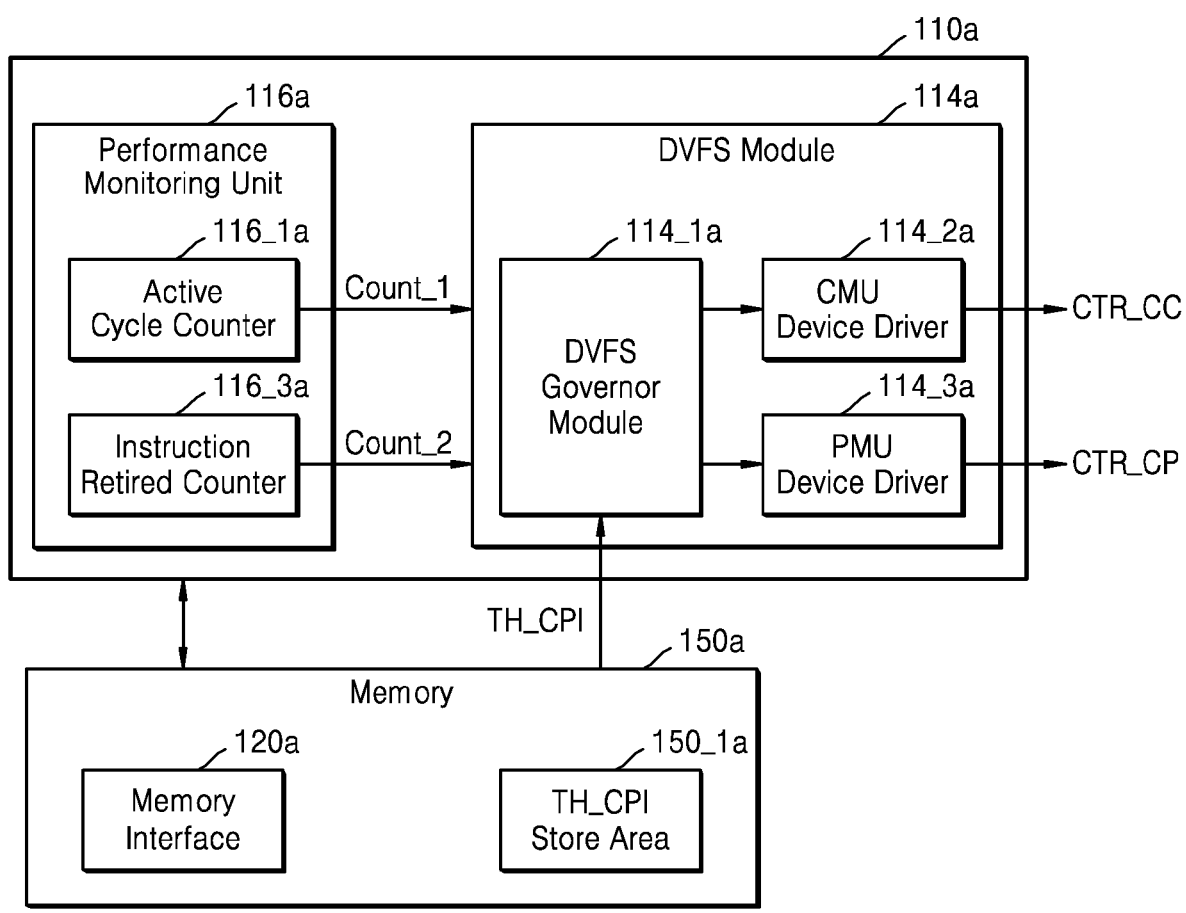
FIG. 2 is a block diagram showing a central processing unit (CPU) according to an exemplary embodiment of the inventive concept.
Figure 3:
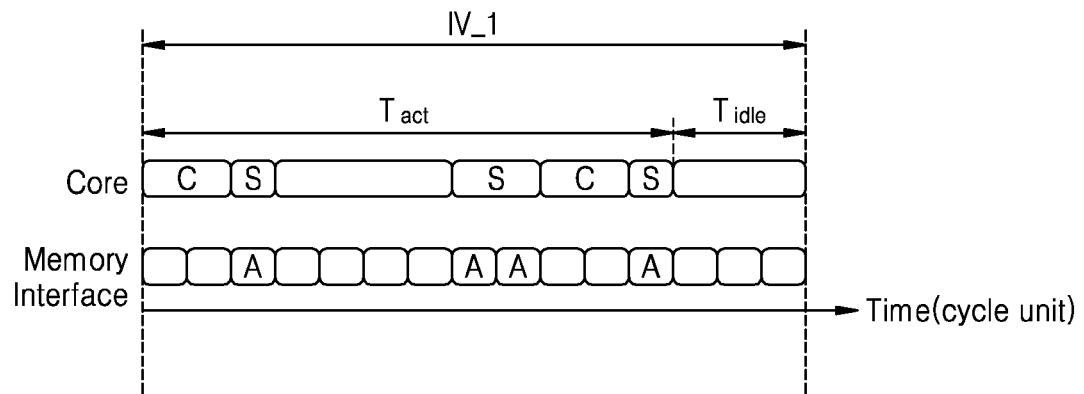
FIG. 3 is a timing diagram illustrating a dynamic voltage and frequency scaling (DVFS) operation with respect to the CPU of FIG. 2, according to an exemplary embodiment of the inventive concept.

FIG. 2 is a block diagram showing a CPU according to an exemplary embodiment of the inventive concept, FIG. 3 is a timing diagram illustrating a DVFS operation with respect to the CPU of FIG. 2, according to an exemplary embodiment of the inventive concept, and FIGS. 4A and 4B are views showing mathematical expressions to obtain a load on a core in a DVFS operation, according to exemplary embodiments of the inventive concept.

Referring to FIG. 2, a CPU 110a may include a DVFS module 114a and a performance monitoring unit 116a. For convenience of explanation, an internal memory 150a may include a memory interface 120a and a threshold cycle per instruction (CPI) store area 150_1a. The performance monitoring unit 116a is hardware implemented in the CPU 110 and measures performance parameters of a core. The performance monitoring unit 116a according to the present exemplary embodiment may include an active cycle counter 116_1a and an instruction retired counter 116_3a. The active cycle counter 116_1a counts a time of a period in which the core processes instructions during a first period to measure a core active cycle. The first period may be a governor window set by a DVFS governor module 114_1a, and a length of the first period may be changed depending on a DVFS operation scheme with respect to the core. The instruction retired counter 116_3a may count the number of instructions processed in the core active cycle period.

The DVFS module 114a may include the DVFS governor module 114_1a, a CMU device driver 114_2a, and a PMIC device driver 114_3a. The DVFS governor module 114_1a may control the DVFS operation. For example, the DVFS governor module 114_1a may collect first count information Count_1 including the core active cycle and second count information Count_2 including the number of executed instructions from the performance monitoring unit 116a, and collect a threshold CPI TH_CPI from the internal memory 150a. The DVFS governor module 114_1a may use the threshold CPI TH_CPI to generate information on the memory access stall cycle of the core. The threshold CPI TH_CPI may be a value obtained by measuring the active cycle required for the core to execute a plurality of instructions that do not need to access the memory interface 120a and converting the measured active cycle to a cycle required to execute one instruction. In other words, the DVFS governor module 114_1a may derive a ratio of the memory access stall cycle included in the core active cycle using the threshold CPI TH_CPI. The threshold CPI TH_CPI will be described in more detail below. In addition, as an example, information, which is generated by the DVFS governor module 114_1a, on the memory access stall cycle may include an SPI (memory access Stall cycle Per Instruction). The SPI will be described in detail below.

Referring to FIGS. 2 and 3, a first period IV_1 includes a core active cycle $T_{act}$ and a core idle cycle $T_{idle}$. The core active cycle $T_{act}$ measured by the active cycle counter 116_1a may include a cycle C in which the core performs the calculation operation and a memory access stall cycle S of a period in which the core accesses the memory interface 120a (as indicated by 'A' in FIG. 3). As described above, since the core may temporarily stop the calculation operation in the memory access stall cycle S, the memory access stall cycle S may be excluded when the load on the core is accurately calculated. Hereinafter, an example of calculating the load on the core by taking into account the memory access stall cycle S will be described.

Referring to FIG. 4A, the DVFS governor module 114_1a may generate the CPI (Cycle Per Instruction) indicating the cycle required to execute one instruction during the core active cycle $T_{act}$ using the core active cycle $T_{act}$ and the number of executed instructions. Since the core active cycle $T_{act}$ may include the memory access stall cycle S when the core accesses the memory interface 120a to execute the instruction, the DVFS governor module 114_1a may correct the core active cycle $T_{act}$ by taking into account the memory access stall cycle S.

As an example, the DVFS governor module 114_1a may compare the CPI with the threshold CPI TH_CPI and may assume that a predetermined memory access stall cycle is included in the core active cycle $T_{act}$ when the CPI exceeds the threshold CPI (Case 1). Accordingly, the DVFS governor module 114_1a may generate the SPI (memory access Stall cycle Per Instruction) indicating the cycle required to access the memory interface 120a by one instruction during the core active cycle $T_{act}$ by subtracting the threshold CPI TH_CPI from the CPI. The DVFS governor module 114_1a may correct the core active cycle $T_{act}$ using the CPI and the SPI. The DVFS governor module 114_1a may calculate a load $CL_{core}$ of the core using a ratio between a corrected core active cycle $T_{act}'$ and a sum ($T_{act}'+T_{idle}$) of the corrected core active cycle and the core idle cycle. The DVFS governor module 114_1a may control each of the CMU device driver 114_2a and the PMIC device driver 114_3a based on the load $CL_{core}$ of the core. The CMU device driver 114_2a may provide the clock control signal CTR_CC to the CMU 130 based on the DVFS operation of the DVFS governor module 114_1a. Accordingly, the CMU 130 may provide the clock signal, having the scaled frequency resulting from the DVFS operation, to the CPU 110a. In addition, the PMIC device driver 114_3a may provide the power control signal CTR_CP to the PMIC 140 based on the DVFS operation of the DVFS governor module 114_1a. Thus, the PMIC 140 may provide the power, having the scaled level resulting from the DVFS operation, to the CPU 110a.

Referring to FIG. 4B, the DVFS governor module 114_1a may compare the CPI with the threshold CPI and may not generate the SPI when the CPI is less than or equal to the threshold CPI TH_CPI (Case 2). In other words, the DVFS governor module 114_1a may assume that the memory access stall cycle S is not included in the core active cycle $T_{act}$ when the CPI is less than or equal to the threshold CPI TH_CPI and may not generate information on the memory access stall cycle S including the SPI. Accordingly, the DVFS governor module 114_1a may calculate the load $CL_{core}$ of the core using a ratio between the core active cycle $T_{act}$ and a sum ($T_{act}+T_{idle}$) of the core active cycle and the core idle cycle.

The DVFS module 114a according to the present exemplary embodiment may determine whether the memory access stall cycle S is included in the core active cycle $T_{act}$ through a simple comparison operation using the threshold CPI TH_CPI. In addition, since the SPI is generated and the core active cycle $T_{act}$ is corrected using a simple calculation operation, the DVFS operation may be efficiently performed, and the performance of the application processor (e.g., the application processor 100 of FIG. 1) may be increased.

Figure 5:
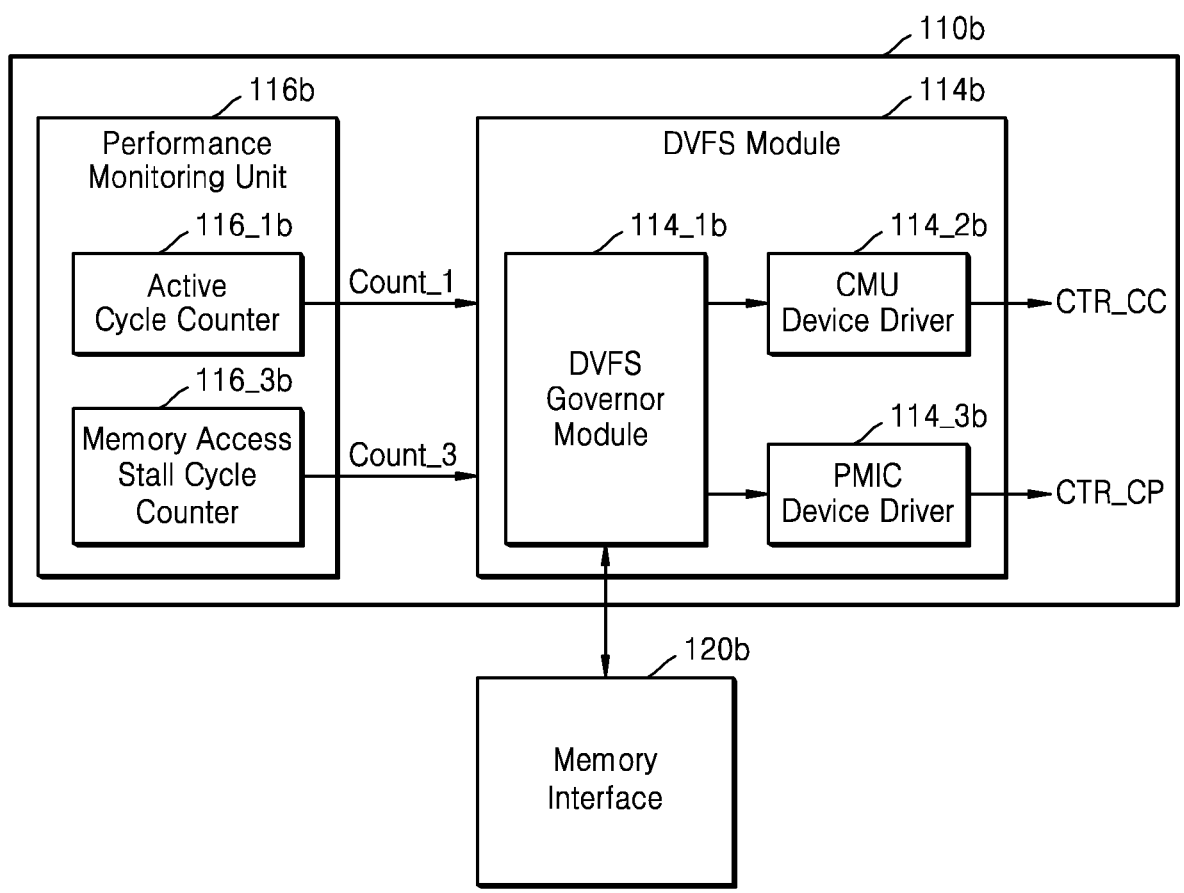
FIG. 5 is a block diagram showing a CPU according to an exemplary embodiment of the inventive concept.
Figure 6:
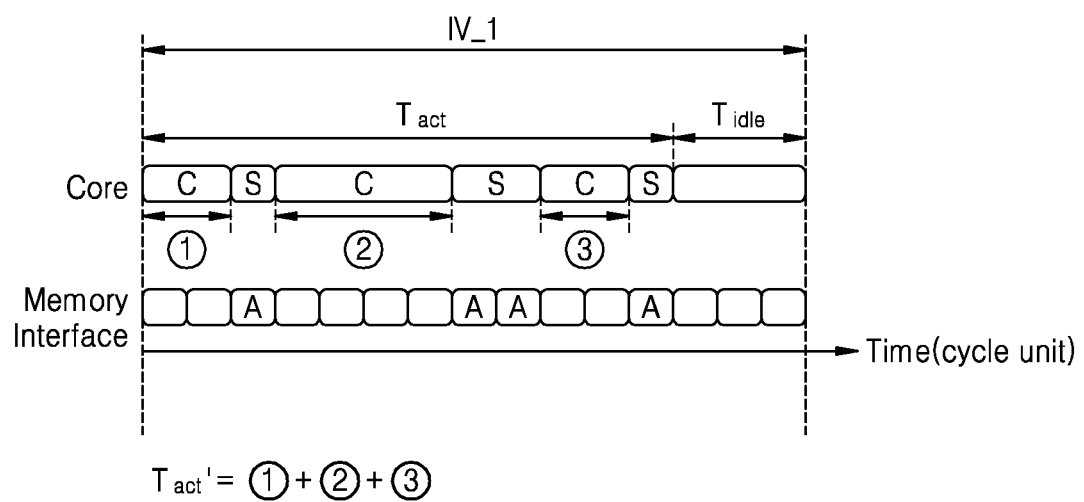
FIG. 6 is a timing diagram illustrating a DVFS operation with respect to the CPU of FIG. 5 according to an exemplary embodiment of the inventive concept.

FIG. 5 is a block diagram showing a CPU according to an exemplary embodiment of the inventive concept, and FIG. 6 is a timing diagram illustrating a DVFS operation with respect to the CPU of FIG. 5 according to an exemplary embodiment of the inventive concept.

Referring to FIG. 5, a CPU 110b may be substantially the same as the CPU 110a of FIG. 2, except for a memory access stall cycle counter 116_3b. For example, the CPU 110b may include a DVFS module 114b and a performance monitoring unit 116b. The performance monitoring unit 116b may include an active cycle counter 116_1b and the memory access stall cycle counter 116_3b. The DVFS module 114b may include a DVFS governor module 114_1b, a CMU device driver 114_2b, and a PMIC device driver 114_3b. The DVFS governor module 114_1b may be connected to a memory interface 120b. Hereinafter, differences between the CPU 110a of FIG. 2 and the CPU 110b will be described.

The memory access stall cycle counter 116_3b may count a period in which the core accesses the memory interface 120b within the core active cycle to measure the memory access stall cycle. The DVFS governor module 114_1b may collect first count information Count_1 including the core active cycle and third count information Count_3 including the memory access stall cycle from the performance monitoring unit 116b.

Referring to FIGS. 5 and 6, the DVFS governor module 114_1b may generate the corrected core active cycle $T_{act}'$ including only the cycle C in which the core performs a calculation operation by subtracting the memory access stall cycle S from the core active cycle $T_{act}$ using the first count information Count_1 and the third count information Count_3. The DVFS governor module 114_1b may accurately calculate the load $CL_{core}$ of the core using a ratio between the corrected core active cycle $T_{act}'$ and a sum ($T_{act}'+T_{idle}$) of the corrected core active cycle and the core idle cycle. The DVFS governor module 114_1b may control each of the CMU device driver 114_2b and the PMIC device driver 114_3b based on the load $CL_{core}$ of the core.

The DVFS module 114b according to the present exemplary embodiment may accurately count and generate the memory access stall cycle S included in the core active cycle $T_{act}$ and calculate the load on the core using the generated memory access stall cycle S, and thus, the DVFS operation may be efficiently performed.

Figure 7:
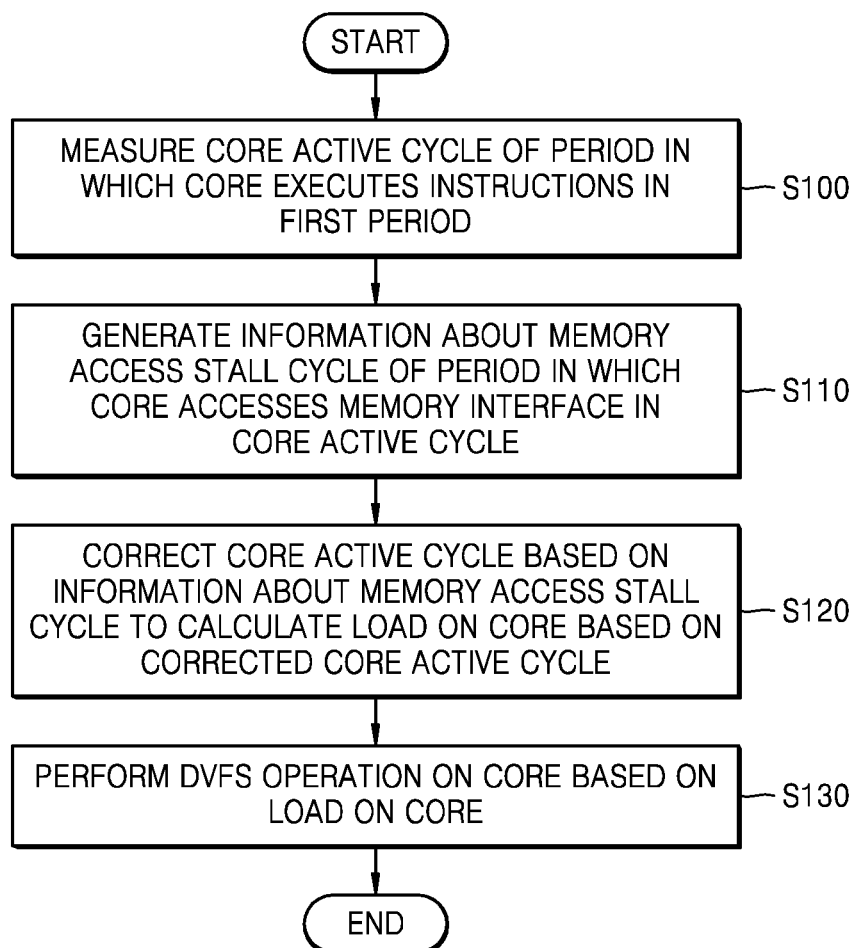
FIG. 7 is a flowchart of an operation method of an application processor, according to an exemplary embodiment of the inventive concept.

FIG. 7 is a flowchart of an operation method of an application processor, according to an exemplary embodiment of the inventive concept.

Referring to FIGS. 2 and 7, the active cycle counter 116_1a may count and measure the core active cycle of the period in which the core performs the operation of executing the instructions within the first period set by the DVFS governor module 114_1a, and the DVFS governor module 114_1a may subtract the core active cycle from the length of the first period to measure the core idle cycle of the period in which the core is in the idle state (S100). Then, the DVFS governor module 114_1a may generate the information on the memory access stall cycle that is the period in which the core accesses the memory interface within the core active cycle (S110). The DVFS governor module 114_1a may correct the core active cycle based on the information on the memory access stall cycle and calculate the load on the core based on the corrected core active cycle (S120). The DVFS governor module 114_1a may perform the DVFS operation on the core based on the load on the core (S130).

Figure 8:
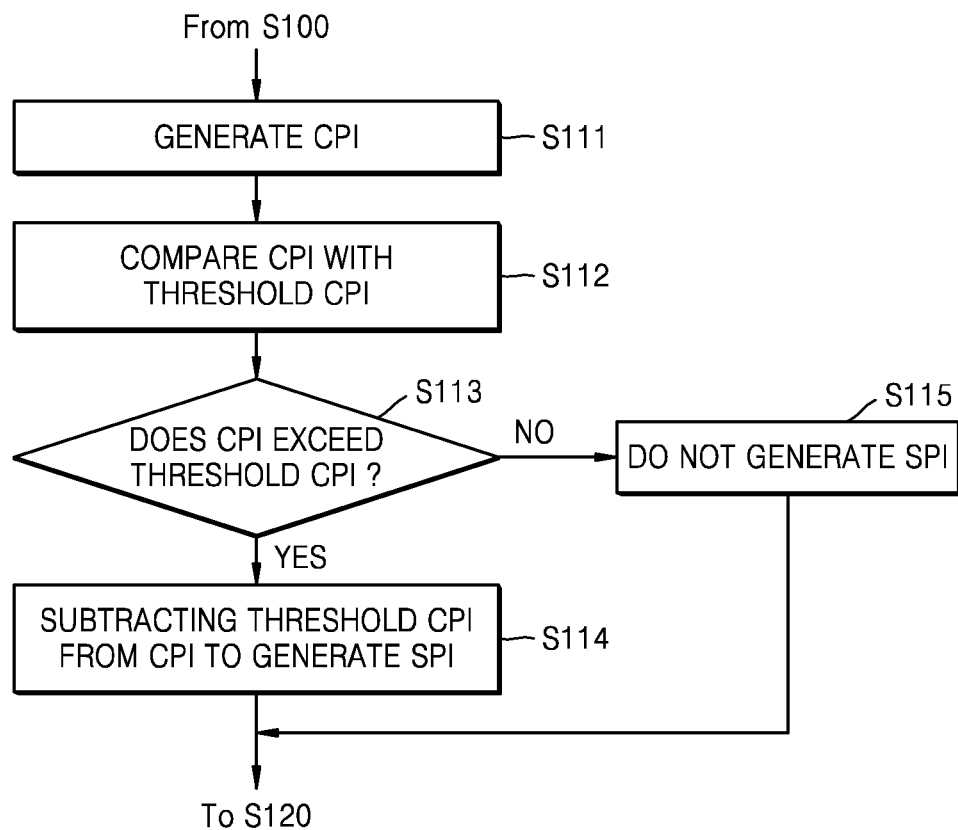
FIG. 8 is a flowchart of a method of operating an application processor to generate information about a memory access stall cycle, according to an exemplary embodiment of the inventive concept.

FIG. 8 is a flowchart of a method of operating an application processor to generate information on a memory access stall cycle, according to an exemplary embodiment of the inventive concept.

Referring to FIGS. 2 and 8, the DVFS governor module 114_1a may collect the core active cycle and the number of executed instructions in the core active cycle from the performance monitoring unit 116a and may generate the CPI indicating the cycle required to execute one instruction during the core active cycle (S111). The DVFS governor module 114_1a may compare the generated CPI with the threshold CPI provided from the internal memory 150a (S112). The DVFS governor module 114_1a may determine whether the CPI exceeds the threshold CPI (S113). When the CPI exceeds the threshold CPI (S113, YES), the DVFS governor module 114_1a may subtract the threshold CPI from the CPI and generate the SPI corresponding to the information on the memory access stall cycle (S114). When the CPI does not exceed the threshold CPI (S113, NO), the DVFS governor module 114_1a may not generate the SPI (S115).

Figure 9:
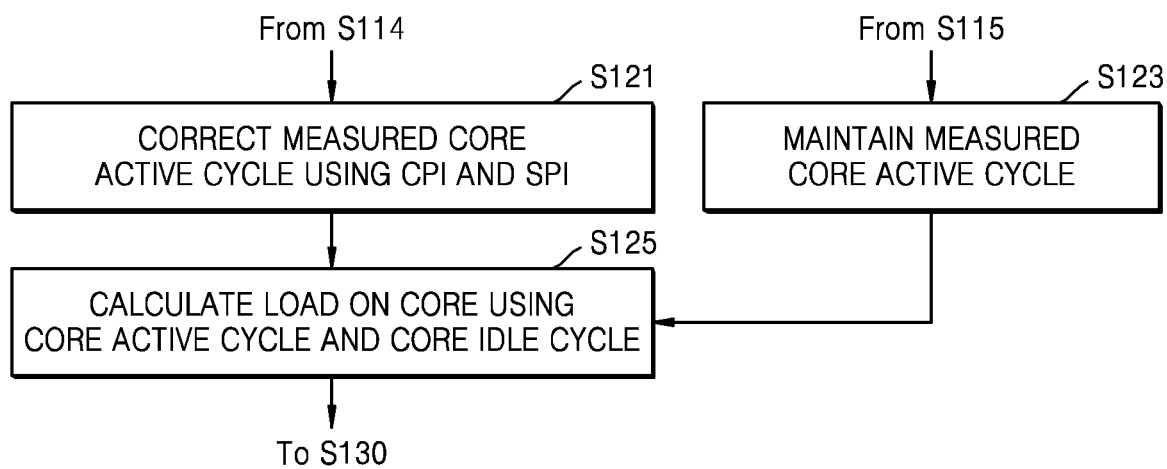
FIG. 9 is a flowchart of a method of operating an application processor to calculate a load on a core, according to an exemplary embodiment of the inventive concept.

FIG. 9 is a flowchart of a method of operating an application processor to calculate a load on a core according to an exemplary embodiment of the inventive concept.

Referring to FIGS. 2 and 9, when the SPI is generated by the DVFS governor module 114_1a (from S114 of FIG. 8), the DVFS governor module 114_1a may correct the core active cycle, which is measured by the active cycle counter 116_1a, using the CPI and SPI (S121). When the SPI is not generated (from S115 of FIG. 8), the DVFS governor module 114_1a may maintain the core active cycle measured by the active cycle counter 116_1a without correcting the core active cycle (S123). Then, the DVFS governor module 114_1a may calculate the load on the core using the core active cycle, which is corrected or not corrected, and the core idle cycle (S125).

Figure 10:
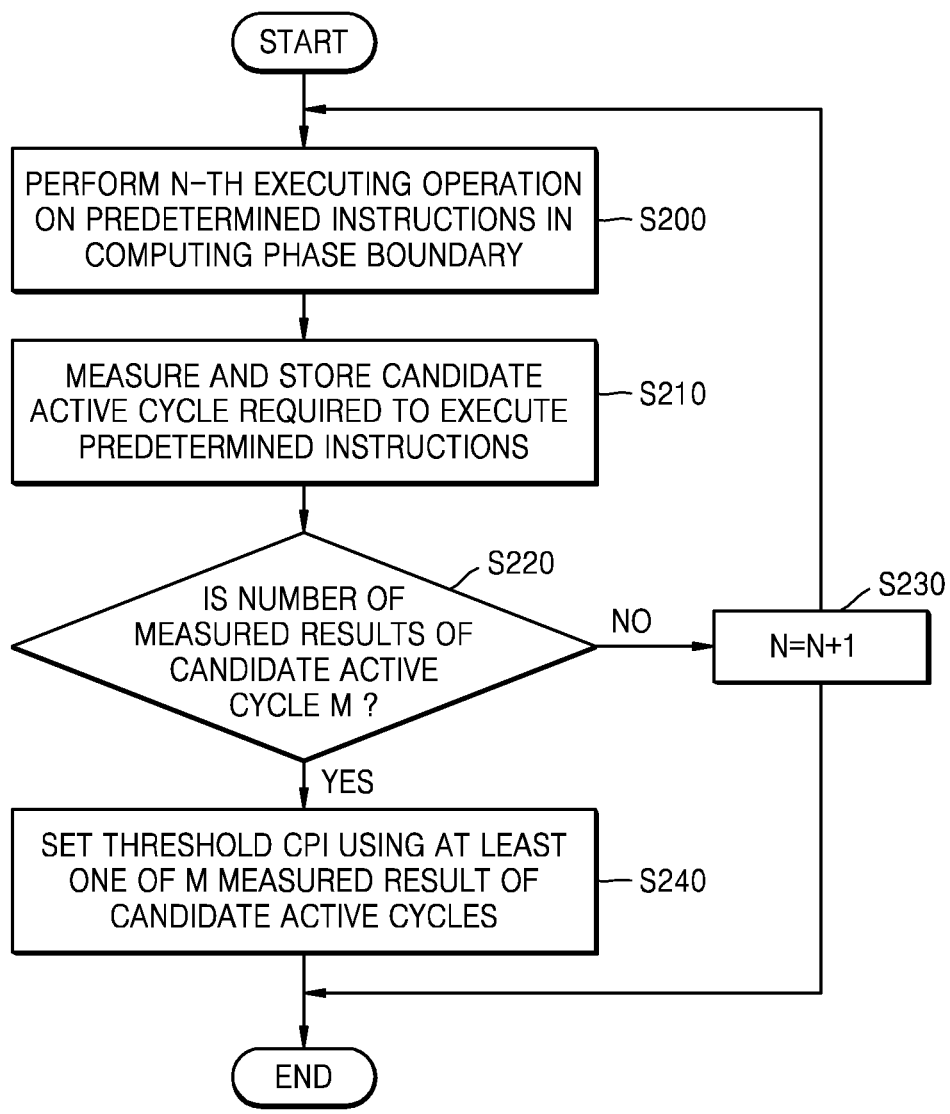
FIGS. 10 and 11 are a flowchart and a table, respectively, showing a method of generating a threshold cycle per instruction (CPI), according to an exemplary embodiment of the inventive concept.
Figure 11:

FIGS. 10 and 11 are a flowchart and a table, respectively, showing a method of generating a threshold CPI, according to an exemplary embodiment of the inventive concept.

Referring to FIG. 10, the core included in the application processor may perform an N-th executing operation on predetermined instructions in a computing phase boundary to set the threshold CPI used to perform the DVFS operation (S200). The core may consecutively perform the calculation operation to execute the predetermined instructions in the computing phase boundary without the period in which the core accesses the memory interface. The core may measure an N-th candidate active cycle required to execute the predetermined instructions and store the measured N-th candidate active cycle (S210). The core may determine whether the number of the generated candidate active cycles according to the measured result is M (S220). "M" may be an arbitrary value that is previously determined to set the threshold CPI. When the number of the generated candidate active cycles according to the measured result is M (S220, YES), e.g., when an M-th executing operation is performed on the predetermined instructions in the computing phase boundary, the core may set the threshold CPI using at least one of the measured M candidate active cycles (S240). When the number of the generated candidate active cycles according to the measured result is not M (S220, NO), the core may increment N by 1 (S230) and again perform the executing operation on the predetermined instructions.

As shown in FIG. 11, a table shows CPKIs (Cycle Per Kilo Instructions) corresponding to the candidate active cycles.

The CPKIs represent a cycle taken to execute 1,000 instructions in the computing phase boundary. The CPKIs corresponding to the candidate active cycles may have different values from one another due to factors, such as a floating calculation, a branch prediction fail, etc., when the instructions are executed. According to the present exemplary embodiment, a candidate active cycle $C_{M\_1}$ having the longest length among the M candidate active cycles may be selected, and the threshold CPI may be set using the selected candidate active cycle C_1. However, according to an exemplary embodiment of the inventive concept, any one of the M candidate active cycles may be selected based on the DVFS operation scheme, and the threshold CPI may be set using the selected candidate active cycle.

Figure 12:
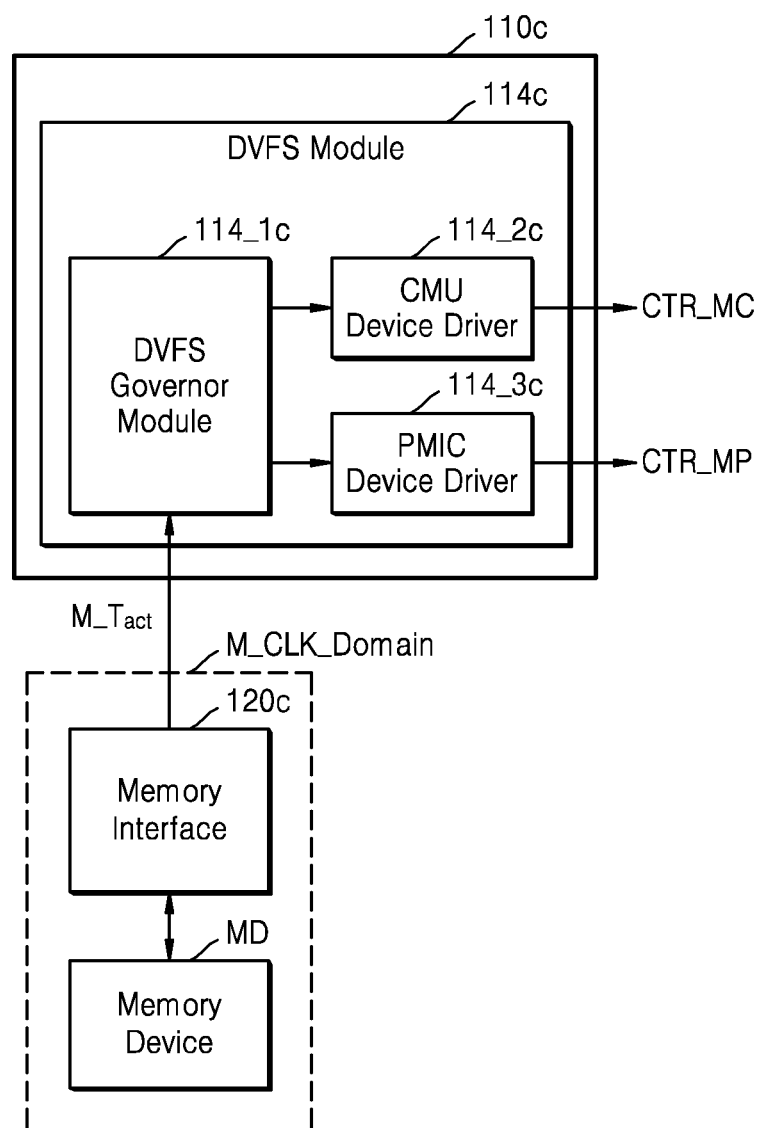
FIG. 12 is a block diagram showing a CPU according to an exemplary embodiment of the inventive concept.

FIG. 12 is a block diagram showing a CPU according to an exemplary embodiment of the inventive concept, and FIG. 13 is a view showing a mathematical expression to obtain a load on a memory interface in a DVFS operation with respect to the memory interface according to an exemplary embodiment of the inventive concept.

Referring to FIG. 12, a CPU 110c may operate a DVFS module 114c, and the DVFS module 114c may include a DVFS governor module 114_1c, a CMU device driver 114_2c, and a PMIC device driver 114_3c. The memory clock domain M_CLK_Domain may include a memory interface 120c and the memory device MD. The DVFS governor module 114_1c may collect the memory active cycle $M\_T_{act}$, which includes a transaction cycle of a period in which a data input/output operation is performed using the memory device MD and a ready operation cycle of a period in which an operation required by the memory device MD to perform the data input/output operation is carried out, from the memory interface 120c during a second period in response to a request from the CPU 110c or another master IP. The second period may be a governor window set by the DVFS governor module 114_1c. A length of the second period may be changed depending on the DVFS operation scheme with respect to the memory interface 120c, and the length of the second period may be equal to or different from the length of the first period described in FIG. 2.

Referring to FIGS. 12 and 13, the DVFS governor module 114_1c may calculate a load $CL_M$ of the memory clock domain M_CLK_Domain using the memory active cycle $M\_T_{act}$, including a data transaction cycle $M\_T_{data}$ and a ready operation cycle $M\_T_{RO}$, and the length $M\_T_{total}$ of the second period. The DVFS governor module 114_1c according to the present exemplary embodiment may control each of the CMU device driver 114_2c and the PMIC device driver 114_3c based on the load $CL_M$ of the memory clock domain M_CLK_Domain. The CMU device driver 114_2c may provide the clock control signal CTR_MC to a CMU based on the DVFS operation of the DVFS governor module 114_1c. Accordingly, the CMU may provide a clock signal, having a scaled frequency resulting from the DVFS operation, to the memory interface 120c. In addition, the PMIC device driver 114_3c may provide the power control signal CTR_MP to a PMIC based on the DVFS operation of the DVFS governor module 114_1c. Thus, the PMIC may provide a power, having a scaled level resulting from the DVFS operation, to the memory interface 120c.

The DVFS module 114c according to the present exemplary embodiment performs the DVFS operation on the memory interface 120c and the memory device MD by taking into account the load on the memory interface 120c and/or the memory device MD, e.g., the memory clock domain M_CLK_Domain, and thus, the performance of the application processor may be increased.

Figure 14A:
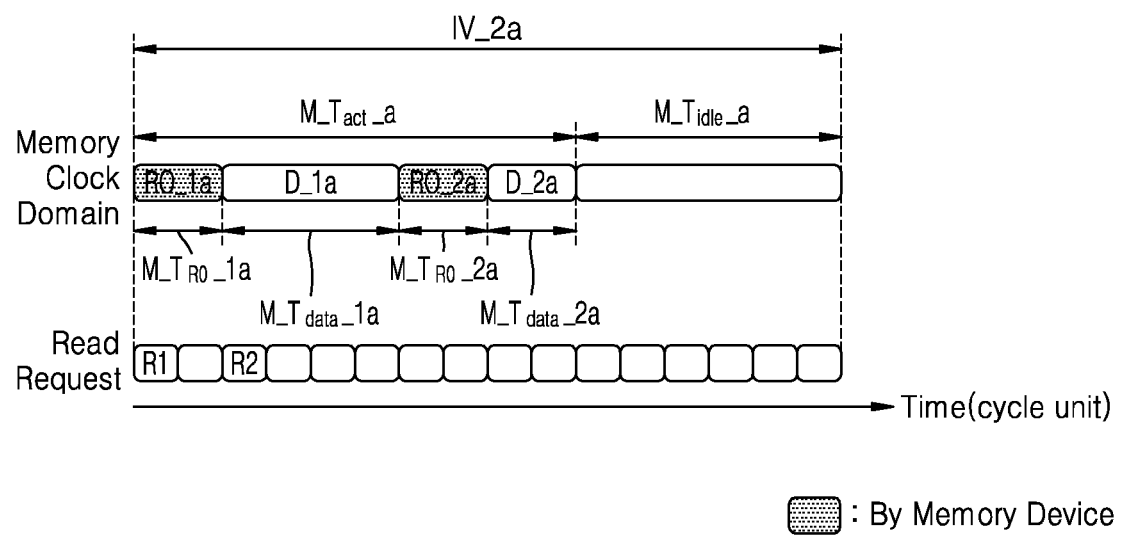
FIGS. 14A and 14B are timing diagrams showing a memory active cycle with respect to a memory clock domain, according to exemplary embodiments of the inventive concept.
Figure 14B:
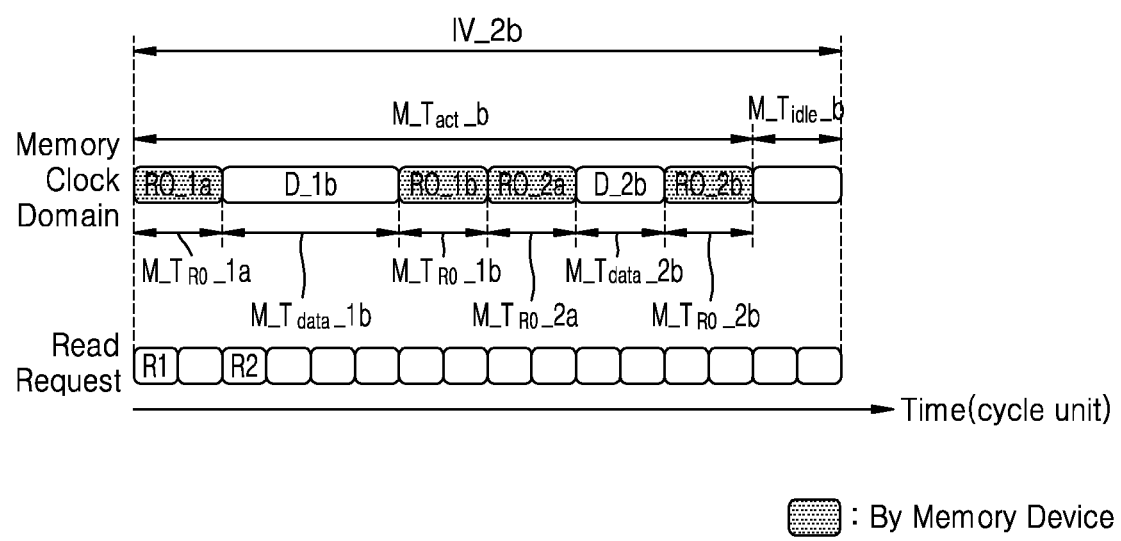

FIGS. 14A and 14B are timing diagrams showing a memory active cycle with respect to a memory clock domain, according to exemplary embodiments of the inventive concept. Referring to FIGS. 12 and 14A, the memory active cycle $M\_T_{act}\_a$ of the memory clock domain M_CLK_Domain may be changed depending on the type of the memory device MD connected to the memory interface 120c. According to an exemplary embodiment of the inventive concept, when the memory device MD corresponds to a first memory device, the memory device MD may perform predetermined ready operations RO_1a and RO_2a in advance to allow the memory interface 120c to perform output operations D_1a and D_2a for read data in response to readout requests R1 and R2. Accordingly, the memory active cycle $M\_T_{act}\_a$ of the memory clock domain M_CLK_Domain in a second period IV_2a may include data transaction cycles $M\_T_{data}\_1a$ and $M\_T_{data}\_2a$ of a period in which the data input/output operation is performed using the memory device MD and ready operation cycles $M\_T_{RO}\_1a$ and $M\_T_{RO}\_2a$ of a period in which an operation required to perform the data input/output operation is carried out by the memory device MD so as to allow the memory device MD to output the read data. A period other than the memory active cycle $M\_T_{act}\_a$ in the second period IV_2a may correspond to a memory idle cycle $M\_T_{idle}\_a$.

Referring to FIGS. 12 and 14B, when the memory device MD corresponds to a second memory device, the memory device MD may perform more ready operations (e.g., RO_1a, RO_1b, RO_2a, and RO_2b) than those in FIG. 14A to allow the memory interface 120c to perform output operations D_1b and D_2b for read data in response to readout requests R1 and R2. Accordingly, a memory active cycle $M\_T_{act}\_b$ of the memory clock domain M_CLK_Domain in a second period IV_2b may include data transaction cycles $M\_T_{data}\_1b$ and $M\_T_{data}\_2b$ of a period in which the data input/output operation is performed using the memory device MD and ready operation cycles $M\_T_{RO}\_1a$, $M\_T_{RO}\_1b$, $M\_T_{RO}\_2a$, and $M\_T_{RO}\_2b$ of a period in which an operation required to perform the data input/output operation is carried out by the memory device MD so as to allow the memory device MD to output the read data, and thus, the memory active cycle $M\_T_{act}\_b$ of the memory clock domain M_CLK_Domain in the second period IV_2b may have a value greater than that of the memory active cycle $M\_T_{act}\_a$ shown in FIG. 14A. A period other than the memory active cycle $M\_T_{act}\_b$ in the second period IV_2b may correspond to a memory idle cycle $M\_T_{idle}\_b$.

As an example, assuming that the memory device MD is a DRAM, the memory device MD may perform the ready operation RO_1a that amplifies the read data using a sense amplifier included in the memory device MD to output the read data before performing the output operation D_1b, and the memory device MD may perform the ready operation RO_1b that precharges memory cells from which the data are read out after performing the output operation D_1b. In addition, the memory device MD may perform the ready operation RO_2a that amplifies the read data using the sense amplifier included in the memory device MD to output the read data before performing the output operation D_2b, and the memory device MD may perform the ready operation RO_2b that precharges the memory cells from which the data are read out after performing the output operation D_2b.

As described above, the DVFS module 114c according to the present exemplary embodiment may calculate the load to which an actual operation state of the memory is reflected by taking into account not only the data transaction cycle that is the period in which the data input/output operation is performed but also a cycle that is required depending on different ready operations according to the type of the memory device MD.

Figure 15:
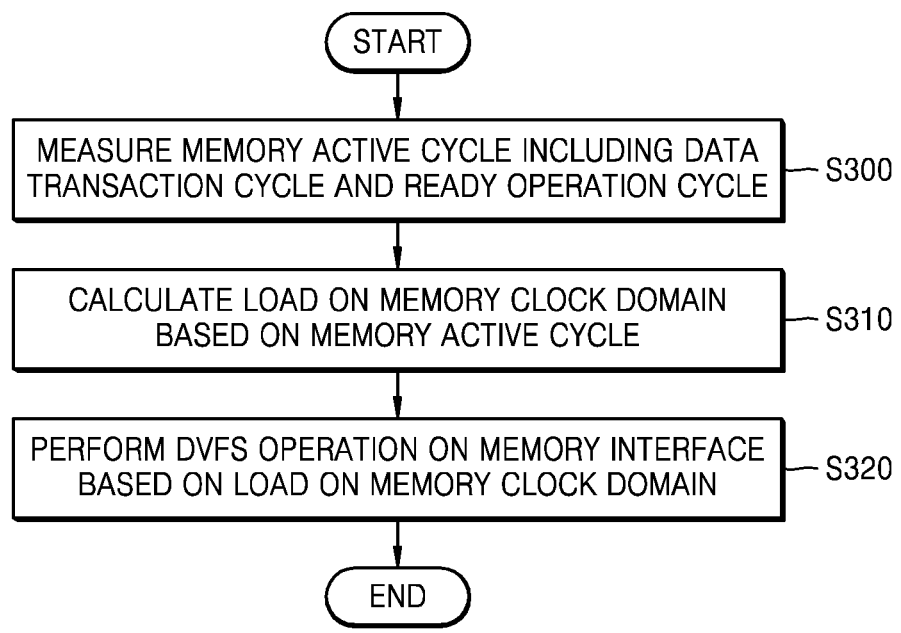
FIG. 15 is a flowchart of a method of performing a DVFS operation with respect to a memory clock domain, according to an exemplary embodiment of the inventive concept.

FIG. 15 is a flowchart of a method of performing a DVFS operation with respect to a memory clock domain according to an exemplary embodiment of the inventive concept.

Referring to FIGS. 12 and 15, the memory interface 120c may measure the memory active cycle $M\_T_{act}$, which includes the data transaction cycle of the period in which the memory interface 120c performs the data input/output operation using the memory device MD in response to the request from at least one of the master IPs and the ready operation cycle of the period in which the operation required to perform the data input/output operation is carried out, in a predetermined period (S300). The DVFS module 114c may calculate the load on the memory clock domain M_CLK_Domain based on the memory active cycle $M\_T_{act}$ (S310). The DVFS governor module 114_1c may perform the DVFS operation on the memory clock domain M_CLK_Domain based on the load on the memory clock domain M_CLK_Domain (S320).

Figure 16:
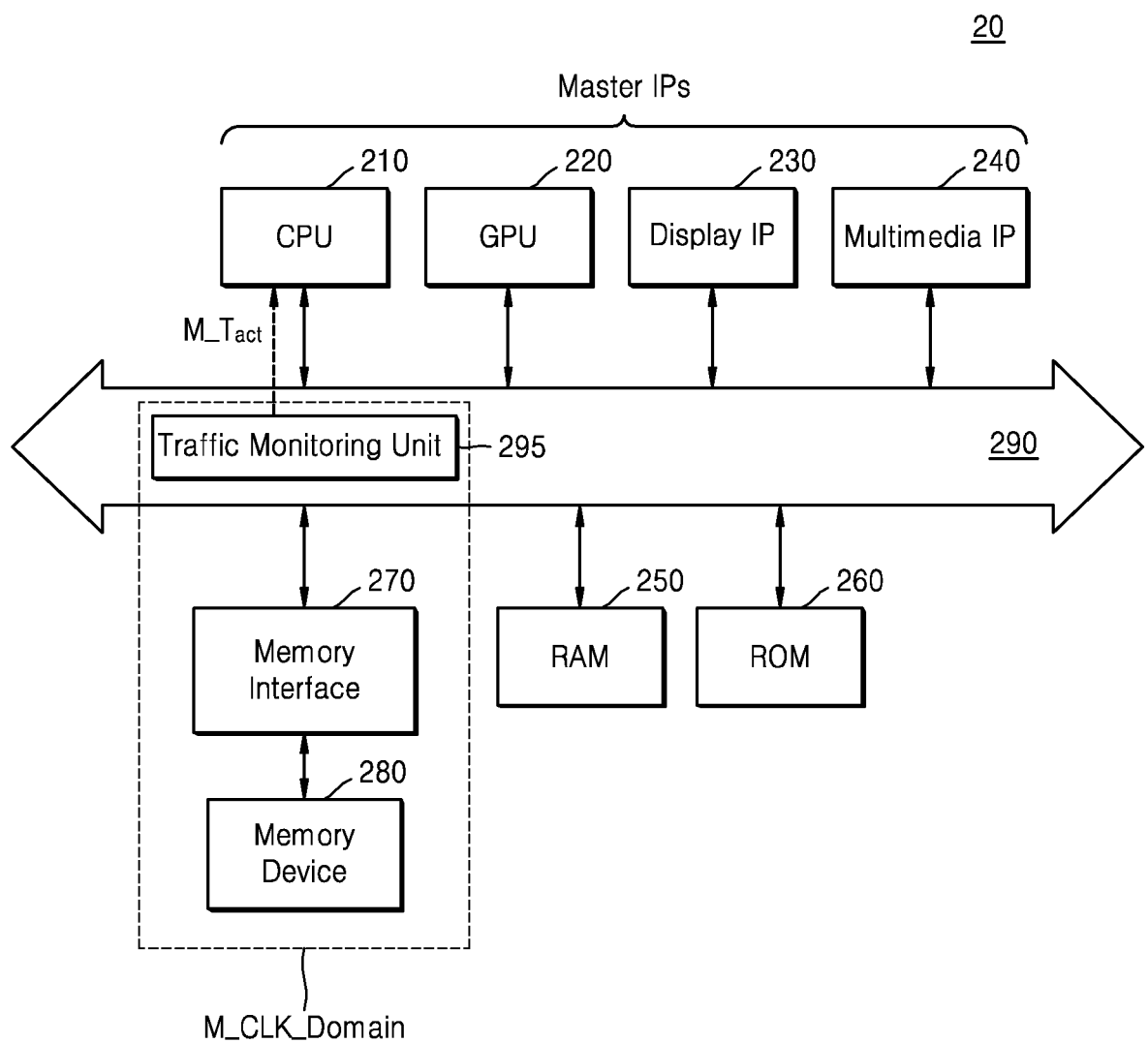
FIG. 16 is a block diagram showing a computing system according to an exemplary embodiment of the inventive concept.

FIG. 16 is a block diagram showing a computing system according to an exemplary embodiment of the inventive concept.

Referring to FIG. 16, a computing system 20 may include a plurality of master IPs 210, 220, 230, and 240, a RAM 250, a ROM 260, a memory interface 270, a memory device 280, and a bus 290. The master IPs may include a CPU 210, a graphics processing unit (GPU) 220, a display IP 230, and a multimedia IP 240, but the master IPs are not limited thereto. For instance, the computing system 20 may further include various master IPs.

Programs and/or data stored in the RAM 250, the ROM 260, and the memory device 280 may be loaded into memories of the master IPs 210, 220, 230, and 240, if necessary. The RAM 250 may temporarily store the programs, data, or instructions. For instance, the programs and/or data may be temporarily stored in the RAM 250 in response to a control of one of the master IPs 210, 220, 230, and 240, or a booting code stored in the ROM 260. The RAM 250 may be implemented by a DRAM or a static RAM (SRAM). The ROM 260 may store permanent programs and/or data. The ROM 260 may be implemented by an erasable programmable read-only memory (EPROM) or an electrically erasable programmable read-only memory (EEPROM).

The memory interface 270 may interface with the memory device 280 and control an overall operation of the memory device 280. In addition, the memory interface 270 may control a data transaction between the master IPs 210, 220, 230, and 240 and the memory device 280 via the bus 290. For instance, the memory interface 270 may write or read the data in or from the memory device 280 in response to a request from the CPU 210.

According to the present exemplary embodiment, the bus 290 may include a traffic monitoring unit 295, and the memory interface 270, the memory device 280, and the traffic monitoring unit 295 may be included in the same memory clock domain M_CLK_Domain. The traffic monitoring unit 295 may measure the memory active cycle $M\_T_{act}$, which includes the data transaction cycle of the period in which the memory interface 270 performs the data input/output operation using the memory device 280 in response to a request from at least one of the master IPs and the ready operation cycle of the period in which an operation required to perform the data input/output operation is carried out, in the predetermined period.

According to an exemplary embodiment of the inventive concept, the traffic monitoring unit 295 may measure a cycle, from a time point at which the request from the at least one of the master IPs reaches the memory clock domain M_CLK_Domain to a time point at which the data input/output operation is completed, as the memory active cycle $M\_T_{act}$.

The CPU 210 performing a DVFS program may collect the memory active cycle $M\_T_{act}$ from the traffic monitoring unit 295, and the CPU 210 may perform the DVFS operation on the memory interface 270 and the memory device 280 based on the memory active cycle $M\_T_{act}$.

The traffic monitoring unit 295 is included in the bus 290 as shown in FIG. 16, but is not limited thereto. For example, the traffic monitoring unit 295 may be located at an arbitrary position in the memory clock domain M_CLK_Domain that is able to precisely detect the time point at which the request reaches the memory interface 270 and the time point at which the data input/output operation is completed in response to the request. For example, the traffic monitoring unit 295 may be included in the memory interface 270.

Figure 17:
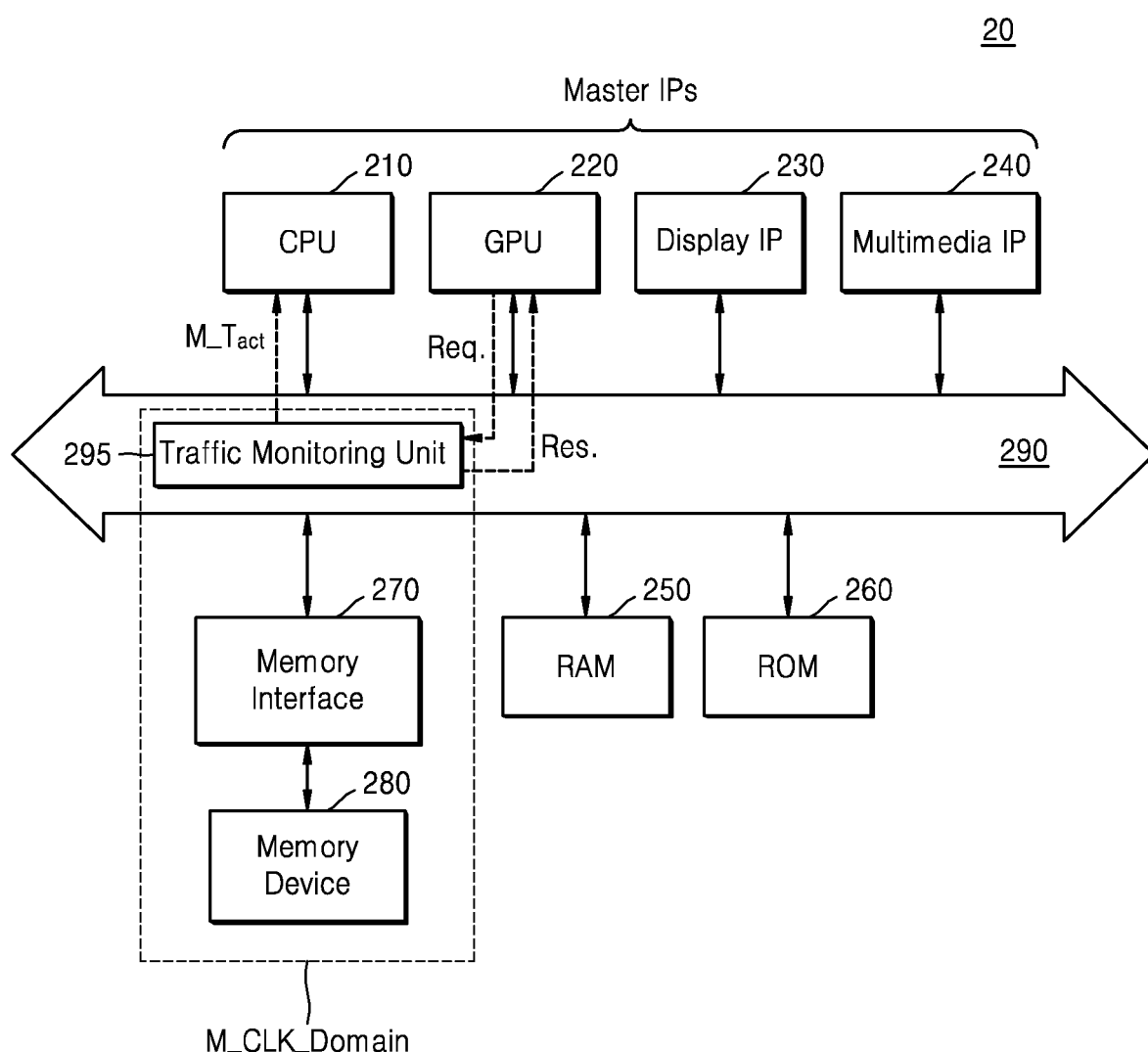
FIG. 17 is a block diagram showing a method of operating the computing system of FIG. 16, according to an exemplary embodiment of the inventive concept.

FIG. 17 is a block diagram showing a method of operating the computing system of FIG. 16 according to an exemplary embodiment of the inventive concept.

Referring to FIG. 17, the GPU 220 may access the memory interface 270 to perform a graphic processing operation. In this case, the traffic monitoring unit 295 according to the present exemplary embodiment may measure the memory active cycle $M\_T_{act}$ by counting the cycle from the time point at which a request (Req.) to access the memory interface 270 reaches the traffic monitoring unit 295 from the GPU 220 to the time point at which the data is output to the GPU 220 from the traffic monitoring unit 295 as a response (Res.) to the request (Req.).

The CPU 210 may collect the memory active cycle $M\_T_{act}$ measured by the traffic monitoring unit 295, and the CPU 210 may perform the DVFS operation on the memory interface 270 and the memory device 280 based on the memory active cycle $M\_T_{act}$.

Figure 18:
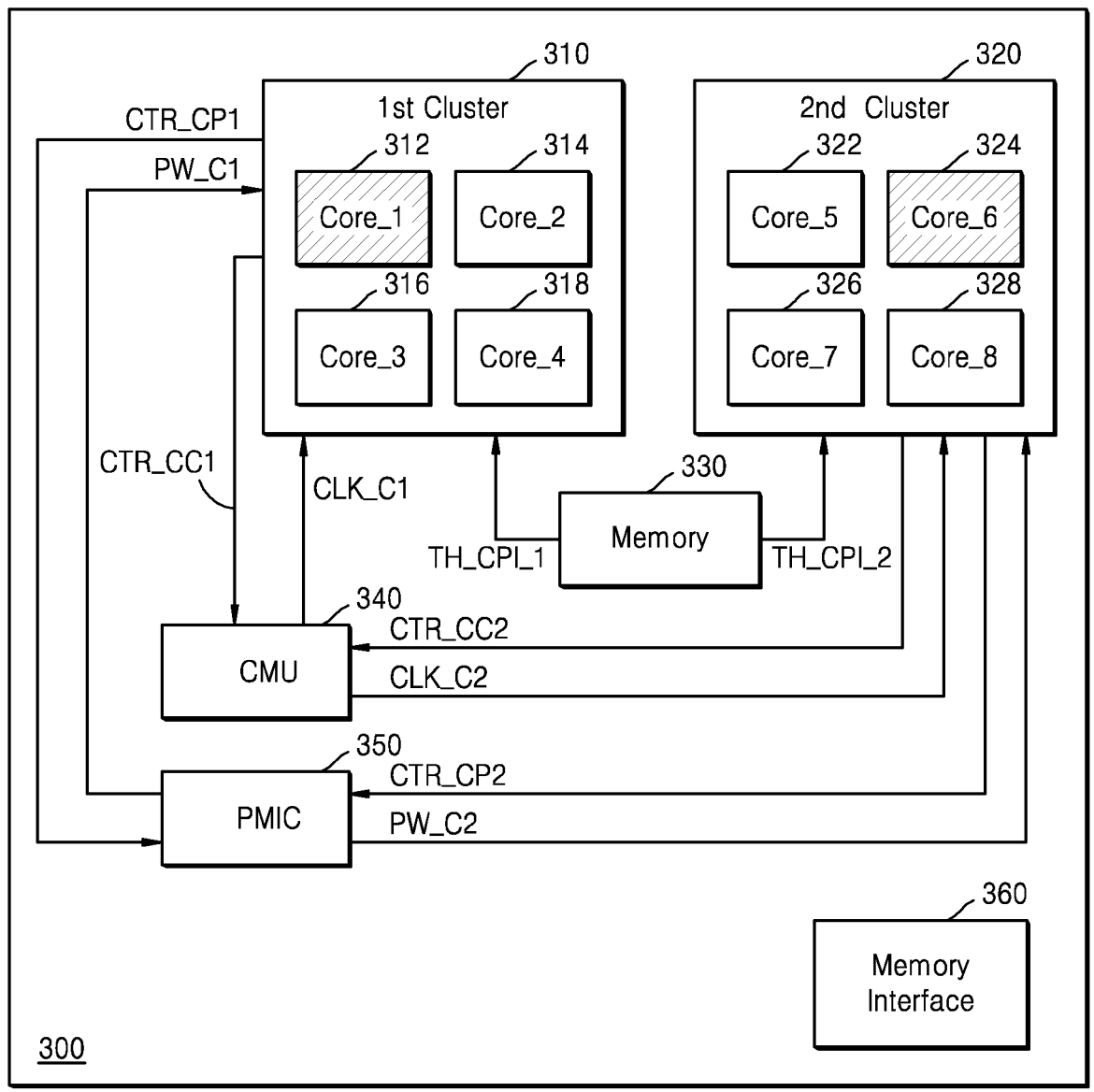
FIG. 18 is a block diagram showing an application processor including multiple cores, according to an exemplary embodiment of the inventive concept.

FIG. 18 is a block diagram showing an application processor including multiple cores according to an exemplary embodiment of the inventive concept.

Referring to FIG. 18, an application processor 300 may include a first cluster 310, a second cluster 320, an internal memory 330, a CMU 340, a PMIC 350, and a memory interface 360. For convenience of explanation, each of the first cluster 310 and the second cluster 320 shown in FIG. 18 includes four cores 312 to 318 and 322 to 328, respectively, but the number of cores in each of the first and second clusters 310 and 320 is not limited thereto.

The first cluster 310 may include first, second, third, and fourth cores 312, 314, 316, and 318, and the second cluster 320 may include fifth, sixth, seventh, and eighth cores 322, 324, 326, and 328. The cores 312 to 318 included in the first cluster 310 may have a performance equal to or different from that of the cores 322 to 328 included in the second cluster 320. Hereinafter, the application processor 300 will be described under the assumption that a calculation amount per unit time of the cores 312 to 318 included in the first cluster 310 is greater than a calculation amount per unit time of the cores 322 to 328 included in the second cluster 320.

The first cluster 310 may receive a first threshold CPI TH_CPI_1 from the internal memory 330, and the second cluster 320 may receive a second threshold CPI TH_CPI_2 from the internal memory 330. Since the first threshold CPI TH_CPI_1 and the second threshold CPI TH_CPI_2 may have different values from each other and the performance of the cores 312 to 318 included in the first cluster 310 is better than the performance of the cores 322 to 328 included in the second cluster 320, the first threshold CPI TH_CPI_1 may have a value smaller than that of the second threshold CPI TH_CPI_2.

Each of the cores 312 to 318 of the first cluster 310 may perform the DVFS operation based on the DVFS program using the first threshold CPI TH_CPI_1. In detail, each of the cores 312 to 318 may measure a core active cycle of a period in which each core executes instructions and a core idle cycle of a period in which each core is in an idle state, and may generate information on a memory access stall cycle of a period in which each core accesses the memory interface 360 in the core active cycle. Each of the cores 312 to 318 may correct the core active cycle based on the information on each memory access stall cycle and calculate a load on each core based on the corrected core active cycle.

In this case, the DVFS operation may be performed on the first cluster 310 based on a core having the largest load among the cores 312 to 318 included in the first cluster 310. For instance, in a case that the load on the first core 312 is the largest among the cores 312 to 318 of the first cluster 310, e.g., the load on the first core 312 is in a heavy load state, the DVFS operation may be performed on the first cluster 310 based on the load on the first core 312.

The first cluster 310 may provide a first clock control signal CTR_CC1 to the CMU 340 based on the load on the first core 312 and receive a first clock signal CLK_C1 of which the frequency is scaled in response to the first clock control signal CTR_CC1. In addition, the first cluster 310 may provide a first power control signal CTR_CP1 to the PMIC 350 based on the load on the first core 312 and receive a first power PW_C1 of which the level is scaled in response to the first power control signal CTR_CP1.

Each of the cores 322 to 328 of the second cluster 320 may perform the DVFS operation based on the DVFS program using the second threshold CPI TH_CPI_2. In this case, the DVFS operation may be performed on the second cluster 320 based on a core having the largest load among the cores 322 to 328 included in the second cluster 320. For instance, in a case that the load on the sixth core 324 is the largest among the cores 322 to 328 of the second cluster 320, e.g., the load on the sixth core 324 is in a heavy load state, the DVFS operation may be performed on the second cluster 320 based on the load on the sixth core 324.

The second cluster 320 may provide a second clock control signal CTR_CC2 to the CMU 340 based on the load on the sixth core 324 and receive a second clock signal CLK_C2 of which the frequency is scaled in response to the second clock control signal CTR_CC2. In addition, the second cluster 320 may provide a second power control signal CTR_CP2 to the PMIC 350 based on the load on the sixth core 324 and receive a second power PW_C2 of which the level is scaled in response to the second power control signal CTR_CP2.

Figure 19:
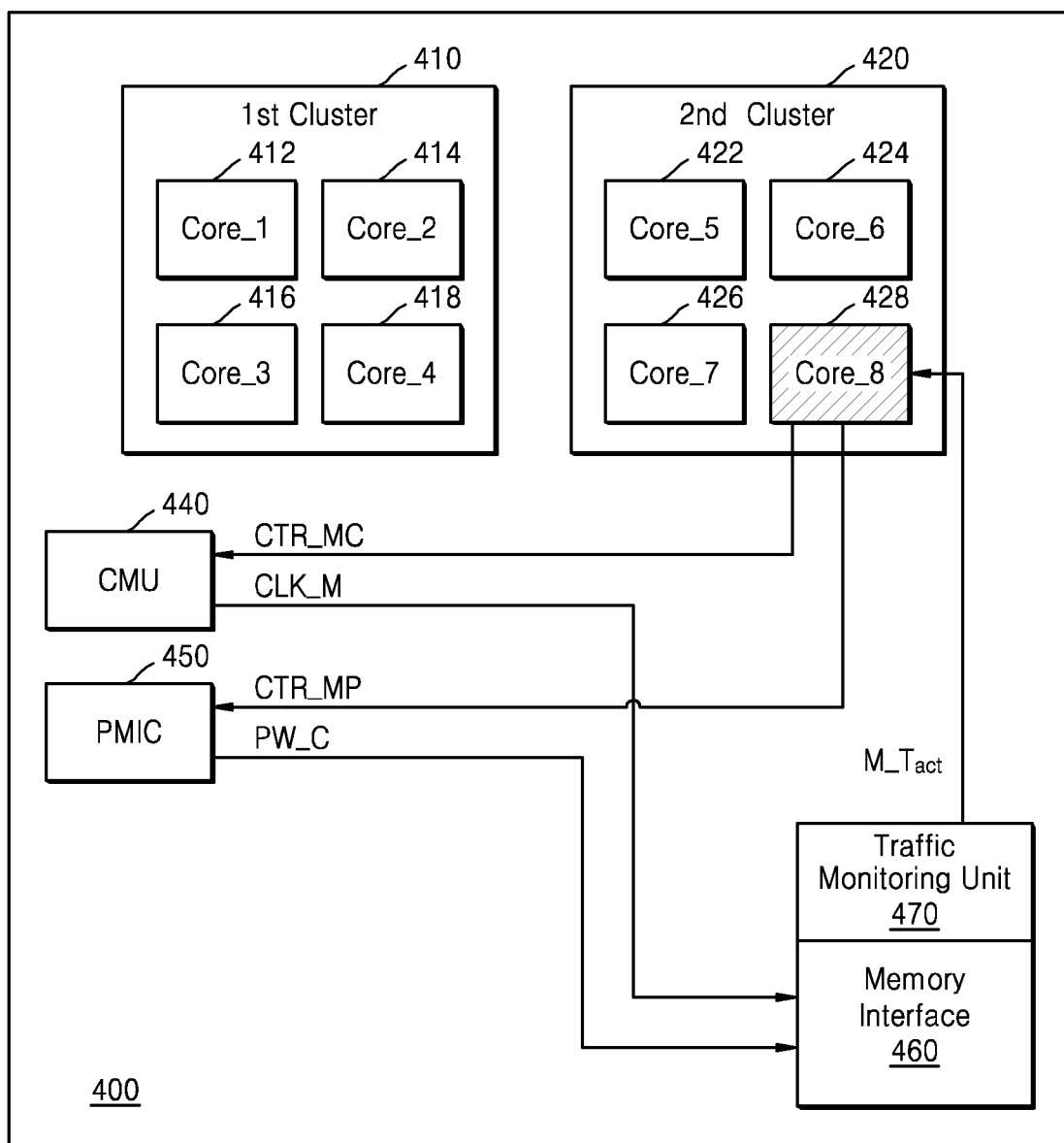
FIG. 19 is a block diagram showing an application processor including multiple cores, according to an exemplary embodiment of the inventive concept.

FIG. 19 is a block diagram showing an application processor including multiple cores according to an exemplary embodiment of the inventive concept.

Referring to FIG. 19, an application processor 400 may include a first cluster 410, a second cluster 420, a CMU 440, a PMIC 450, a memory interface 460, and a traffic monitoring unit 470. The first cluster 410 and the second cluster 420 have substantially the same configuration as the first cluster 310 and the second cluster 320, respectively, shown in FIG. 18, and thus, detailed descriptions of the first and second clusters 410 and 420 will be omitted. The memory interface 460 and the traffic monitoring unit 470 may be included in the same memory clock domain. According to an exemplary embodiment of the inventive concept, one of cores 412 to 428 included in the first and second clusters 410 and 420 may perform the DVFS operation on the memory interface 460 based on the DVFS program. For instance, each of the cores 412 to 428 may receive a predetermined signal (or an interrupt signal) before performing the DVFS operation on the memory interface 460, and a core that receives the signal first or responds to the predetermined signal first may be selected to perform the DVFS operation on the memory interface 460. Hereinafter, it is assumed that the eighth core 428 of the second cluster 420 is selected to perform the DVFS operation on the memory interface 460.

The eighth core 428 may collect the memory active cycle M_$T_{act}$ generated by the traffic monitoring unit 470 and provide the clock control signal CTR_MC to the CMU 440 and the power control signal CTR_MP to the PMIC 450 based on the memory active cycle M_$T_{act}$ The CMU 440 may provide the clock signal CLK_M having a scaled frequency to the memory interface 460 in response to the clock control signal CTR_MC, and the PMIC 450 may provide the power PW_C having a scaled level to the memory interface 460 in response to the power control signal CTR_MP.

Figure 20:
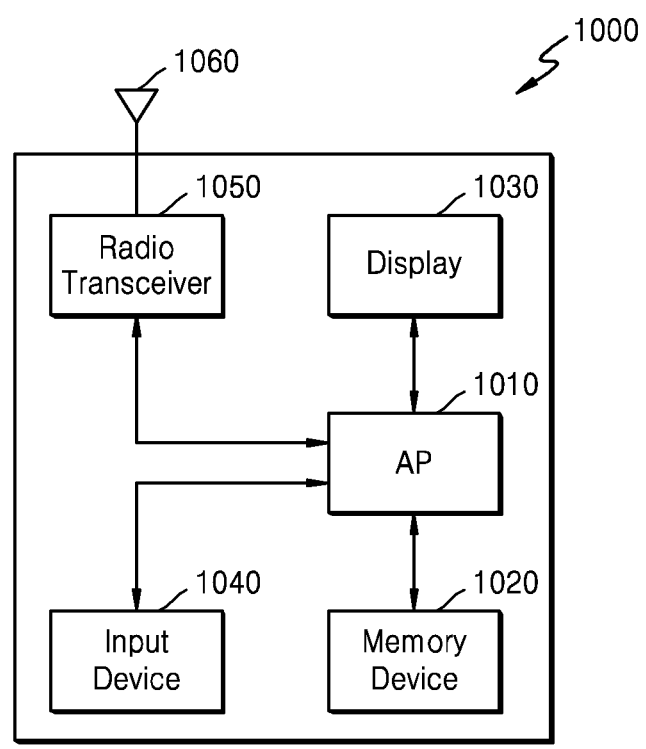
FIG. 20 is a block diagram showing a communication apparatus including an application processor, according to an exemplary embodiment of the inventive concept.

FIG. 20 is a block diagram showing a communication apparatus including an application processor according to an exemplary embodiment of the inventive concept.

Referring to FIG. 20, a communication device 1000 may include an application processor 1010, a memory device 1020, a display 1030, an input device 1040, and a radio transceiver 1050.

The radio transceiver 1050 may transmit or receive a radio signal through an antenna 1060. For instance, the radio transceiver 1050 may convert the radio signal provided through the antenna 1060 to a signal that may be processed by the application processor 1010.

Accordingly, the application processor 1010 may process a signal output from the radio transceiver 1050 and transmit the processed signal to the display 1030. In addition, the radio transceiver 1050 may convert a signal output from the application processor 1010 to a radio signal and output the converted radio signal to an external device via the antenna 1060.

The input device 1040 may be a device that inputs a control signal to control an operation of the application processor 1010 or data to be processed by the application processor 1010, and may be implemented by a pointing device (such as a touch pad, a computer mouse, etc.), a keypad, or a keyboard.

According to an exemplary embodiment of the inventive concept, the application processor 1010 may separately perform a DVFS operation with respect to a CPU clock domain of a CPU included in the application processor 1010 and a DVFS operation with respect to a memory clock domain including a memory interface included in the application processor 1010 and the memory device 1020. When the application processor 1010 performs the DVFS operation with respect to the CPU clock domain, the application processor 1010 may perform the DVFS operation by taking into account a memory access stall cycle of a period in which the CPU accesses the memory interface. In addition, when the application processor 1010 performs the DVFS operation with respect to the memory clock domain, the application processor 1010 may perform the DVFS operation by taking into account not only a cycle of a period in which the data is transacted, but also a cycle of a period in which an operation required to input/output the data is performed. To perform the DVFS operation, the application processor 1010 may further include a DVFS controller.

The communication device 1000 may further include a PMIC to provide power to various components included in the communication device 1000.

While the inventive concept has been described with reference to exemplary embodiments thereof, it is to be understood by those of ordinary skill in the art that various modifications, substitutions, and equivalent arrangements may be made thereto without departing from the spirit and scope of the inventive concept as set forth in the following claims.

What is claimed is:

1. A computing system, comprising:
a processor configured to measure a memory active cycle in a predetermined period;
a plurality of master devices comprising a central processing unit (CPU);
a memory device configured to store programs and/or data which is loaded into memories of the plurality of master devices; and
a memory interface configured to interface with the memory device and control an overall operation of the memory device,
wherein the memory active cycle includes a data transaction cycle and a ready operation cycle,
wherein the processor is further configured to measure a cycle, from a time point at which a request by one of the master devices to access the memory interface reaches the processor to a time point at which data is output from the processor to the one master device as a response to the request, as the memory active cycle.

2. The computing system of claim 1, wherein during the data transaction cycle, the memory interface performs a data input/output operation using the memory device in response to the request.

3. The computing system of claim 1, wherein during the ready operation cycle, an operation required to perform a data input/output operation is carried out.

4. The computing system of claim 1, wherein the CPU is configured to perform a dynamic voltage and frequency scaling (DVFS) program.

5. The computing system of claim 1, wherein the CPU is configured to collect the memory active cycle from the processor, and perform a dynamic voltage and frequency scaling (DVFS) operation on the memory interface and the memory device based on the memory active cycle.

6. The computing system of claim 1, wherein the processor is included in a bus.

7. The computing system of claim 2, wherein the processor is located in a memory clock domain that is able to precisely detect a time point at which the request reaches the memory interface and a time point at which the data input/output operation is completed in response to the request.

8. The computing system of claim 1, wherein the processor is included in the memory interface.

9. The computing system of claim 1, wherein the plurality of master devices comprises at least one of a graphics processing unit (GPU), a display device, and a multimedia device.

10. The computing system of claim 1, wherein the memory interface controls a data transaction between at least one of the plurality of master devices and the memory device via a bus.

11. The computing system of claim 1, wherein the memory interface, the memory device, and the processor are included in a same memory clock domain.

12. The computing system of claim 1, further comprising:
at least one of a random access memory (RAM) and a read-only memory (ROM).

13. A method of operating a computing system, comprising:
accessing, by a master device, a memory interface to perform an operation of the master device;
measuring, by a processor, a memory active cycle by counting a cycle from a time point at which a request by the master device to access the memory interface reaches the processor to a time point at which data is output from the processor to the master device as a response to the request;
collecting, by a central processing unit (CPU), the memory active cycle measured by the processor; and
performing a dynamic voltage and frequency scaling (DVFS) operation on the memory interface and a memory device based on the memory active cycle.

14. The method of claim 13, wherein the memory active cycle includes a data transaction cycle and a ready operation cycle.

15. The method of claim 14, wherein during the data transaction cycle, the memory interface performs a data input/output operation using the memory device in response to a request from the master device.

16. The method of claim 14, wherein during the ready operation cycle, an operation required to perform a data input/output operation is carried out.

17. The method of claim 13, wherein the processor is included in a bus.

18. The method of claim 13, wherein the processor is located in a memory clock domain that is able to precisely detect a time point at which the request reaches the memory interface and a time point at which a data input/output operation is completed in response to the request.

19. The method of claim 13, wherein the processor is included in the memory interface.

20. The method of claim 13, wherein the master device is a graphics processing unit (GPU), a display device, or a multimedia device.

21. The method of claim 13, wherein the memory interface controls a data transaction between the master device and the memory device via a bus.

22. The method of claim 13, wherein the memory interface, the memory device, and the processor are included in a same memory clock domain.

23. A computing system, comprising: a memory interface connected to at least one external memory device; an input/output interface connected to at least one external master device;
a multi-core central processing unit (CPU) including a plurality of cores;
a processor configured to measure a memory active cycle which includes a data transaction cycle of a period in which the memory interface performs a data input/output operation using the at least one external memory device in response to a request from the at least one external master device and a ready operation cycle of a period in which an operation required to perform the data input/output operation is carried out, in a predetermined period,
wherein the processor measures a cycle, from a time point at which a request by a given master device of the at least one external master device to access the memory interface reaches the processor to a time point at which data is output tram the processor to the liven master device as a response to the request, as the memory active cycle; and
a clock management unit (CMU),
wherein one of the cores collects the memory active cycle from the processor and provides a clock control signal to the CMU based on the memory active cycle, and wherein the CMU provides a clock signal to the memory interface having a scaled frequency in response to the clock control signal.

* * * * *